US012667143B2

(12) United States Patent
Hasan et al.

(10) Patent No.: US 12,667,143 B2
(45) Date of Patent: Jun. 30, 2026

(54) MULTIFUNCTIONAL FILTER MATERIALS

(71) Applicant: Khalifa University of Science and Technology, Abu Dhabi (AE)

(72) Inventors: Shadi Wajih Hasan, Abu Dhabi (AE); Musthafa Mavukkandy, Abu Dhabi (AE)

(73) Assignee: Khalifa University of Science and Technology, Abu Dhabi (AE)

( * ) Notice: Subject to any disclaimer, the term of this patent is extended or adjusted under 35 U.S.C. 154(b) by 560 days.

(21) Appl. No.: 17/928,706

(22) PCT Filed: May 4, 2021

(86) PCT No.: PCT/IB2021/053754
§ 371 (c)(1),
(2) Date: Nov. 30, 2022

(87) PCT Pub. No.: WO2022/003433
PCT Pub. Date: Jan. 6, 2022

(65) Prior Publication Data
US 2023/0292860 A1 Sep. 21, 2023

Related U.S. Application Data

(60) Provisional application No. 63/078,409, filed on Sep. 15, 2020, provisional application No. 63/045,457, filed on Jun. 29, 2020.

(51) Int. Cl.
*A41D 13/11* (2006.01)
*A41D 31/30* (2019.01)
(Continued)

(52) U.S. Cl.
CPC .......... *A41D 13/1192* (2013.01); *A41D 31/30* (2019.02); *A62B 23/025* (2013.01);
(Continued)

(58) Field of Classification Search
None
See application file for complete search history.

(56) References Cited

U.S. PATENT DOCUMENTS 9,393,216 B2 7/2016 Woodrow et al.
11,484,445 B1 * 11/2022 Garner .................. A01N 59/16
(Continued)

FOREIGN PATENT DOCUMENTS

AU 2013381874 B2 3/2018
CN 101352630 A 1/2009
(Continued)

OTHER PUBLICATIONS

KR20190091652A_ENG (Espacenet machine translation of Min) (Year: 2019).*
(Continued)

*Primary Examiner* — Gabriel E Gitman
(74) *Attorney, Agent, or Firm* — Billion & Armitage

(57) ABSTRACT

Embodiments include a filter material including an electrospun nanofiber membrane and an active nanomaterial agent incorporated into the electrospun nanofiber membrane, wherein the electrospun nanofiber membrane filters disease-causing agents and the wherein the active nanomaterial agent degrades disease-causing agents. Embodiments further include a face mask and/or respirator including a filter material, wherein the filter material includes an electrospun nanofiber membrane and an active nanomaterial agent incorporated into the electrospun nanofiber membrane, wherein the electrospun nanofiber membrane filters disease-causing agents and the wherein the active nanomaterial agent degrades disease-causing agents.

20 Claims, 5 Drawing Sheets

(51) Int. Cl.

| | | |
|---|---|---|
| *A62B 23/02* | (2006.01) | |
| *B01D 39/16* | (2006.01) | |
| *B01D 39/20* | (2006.01) | |
| *B01D 69/14* | (2006.01) | |
| *D04H 1/4282* | (2012.01) | |
| *D04H 1/728* | (2012.01) | |
| *D01D 5/00* | (2006.01) | |
| *D01F 1/10* | (2006.01) | |

(52) U.S. Cl.

CPC ..... *B01D 39/1623* (2013.01); *B01D 39/2031* (2013.01); *B01D 39/2072* (2013.01); *B01D 69/148* (2013.01); *D04H 1/4282* (2013.01); *D04H 1/728* (2013.01); *B01D 2239/025* (2013.01); *B01D 2239/0258* (2013.01); *B01D 2239/0275* (2013.01); *B01D 2239/0421* (2013.01); *B01D 2239/0435* (2013.01); *B01D 2239/0442* (2013.01); *B01D 2239/0631* (2013.01); *B01D 2239/1216* (2013.01); *B01D 2239/1275* (2013.01); *B01D 2323/39* (2013.01); *D01D 5/0038* (2013.01); *D01F 1/103* (2013.01)

(56) References Cited

U.S. PATENT DOCUMENTS

| | | | | | |
|---|---|---|---|---|---|
| 2004/0241216 A1* | 12/2004 | Klun | ...................... | B32B 27/02 424/445 |
| 2012/0272967 A1* | 11/2012 | Stewart | .............. | A41D 13/1192 128/206.12 |
| 2018/0080148 A1* | 3/2018 | Westerhoff | ............... | B01J 35/45 |
| 2018/0126316 A1* | 5/2018 | Seo | .................... | B01D 69/1071 |
| 2020/0179848 A1* | 6/2020 | Higginson | ......... | B01D 39/2072 |
| 2021/0345708 A1* | 11/2021 | Mousa | ................. | A62B 23/025 |
| 2021/0402355 A1* | 12/2021 | Collins | ............... | B01D 69/144 |
| 2023/0173423 A1* | 6/2023 | Yuksel Imer | ...... | B01D 39/2065 96/225 |

FOREIGN PATENT DOCUMENTS

| | | | | | |
|---|---|---|---|---|---|
| CN | 102872653 A | | 1/2013 | | |
| CN | 102872653 B | | 10/2014 | | |
| CN | 103520999 B | | 1/2016 | | |
| CN | 106192209 A | | 12/2016 | | |
| CN | 107283969 A | * | 10/2017 | .......... | D01D 5/0069 |
| CN | 108722068 A | * | 11/2018 | .......... | B01D 46/546 |
| CN | 110042567 A | | 7/2019 | | |
| DE | 202020102548 U1 | * | 5/2020 | .......... | A62B 18/025 |
| KR | 20110025551 A | * | 3/2011 | ............... | A62B 7/10 |
| KR | 20190091652 A | * | 8/2019 | ............. | D01F 1/103 |
| TW | 1546115 B | * | 8/2016 | ............... | D01D 1/02 |

OTHER PUBLICATIONS

CN107283969A_ENG (Espacenet machine translation of Wang) (Year: 2017).*

KR20110025551A_ENG (Espacenet machine translation of Wi) (Year: 2011).*

TWI546115B—preview (IP.com machine translation of Nian) (Year: 2016).*

CN108722068A_ENG (Espacenet machine translation of Zhang) (Year: 2018).*

DE202020102548U1_ENG (Espacenet machine translation of Falke KGaA) (Year: 2020).*

Cowling, Benjamin J, et al., "Epidemiological research priorities for public health control of the ongoing global novel coronavirus (2019-nCoV) outbreak", Euro Surveill. https://doi.org/10.2807/1560-7917.ES.2020.25.6.2000110, 2020.

Ha'Er, G.B. , et al., "The Efficacy of Standard Surgical Face Masks: An Investigation Using "Tracer Particles"", Clin. Orthop. Relat. Res. 148, 160-162 (1980).

Han, Qingmei , et al., "Uncertainties about the transmission routes of 2019 novel coronavirus", Influenza Other Respi Viruses. 2020;14:470-471.

Huang, Chengbo , et al., "N-halamine antibacterial nanofibrous mats based on polyacrylonitrile and N-halamine for protective face masks", Journal of Engineered Fibers and Fabrics, vol. 14: 1-8, 2019.

Jiang, Jinhong , et al., "Surface Characteristics of a Self-Polymerized Dopamine Coating Deposited on Hydrophobic Polymer Films", Langmuir, 27, 14180-14187, Oct. 19, 2011.

Johnson, D. F. , et al., "A Quantitative Assessment of the Efficacy of Surgical and N95 Masks to Filter Influenza Virus in Patients with Acute Influenza Infection", Brief Report, CID 2009:49 (Jul. 15), 275-277.

Kutter, Jasmin S, et al., "Transmission routes of respiratory viruses among humans", Current Opinion in Virology 2018, 28:142-151.

Liu, Chong , et al., "Transparent air filter for high-efficiency PM2.5 capture", Nature Communications, DOI: 10.1038/ncomms7205, Feb. 16, 2015, 9 pages.

Macintyre, C Raina , et al., "Facemasks for the prevention of infection in healthcare and community settings", BMJ: British Medical Journal, Apr. 6, 2015-Apr. 12, 2015, vol. 350 (Apr. 6, 2015-Apr. 12, 2015), 1-12.

Milton, Donald K., et al., "Influenza Virus Aerosols in Human Exhaled Breath: Particle Size, Culturability, and Effect of Surgical Masks", PLOS Pathogens, vol. 9, Issue 3, Mar. 2013, 7 pages.

Nichols, W. Garrett, et al., "Respiratory Viruses Other than Influenza Virus: Impact and Therapeutic Advances", Clinical Microbiology Reviews, Apr. 2008, p. 274-290, vol. 21, No. 2.

Patel, Rajeev B., et al., "Respiratory source control using a surgical mask: An in vitro study", Journal of Occupational and Environmental Hygiene, 13:7, 569-576, DOI: 10.1080/15459624.2015.1043050.

Shiu, Eunice Y.C., et al., "Controversy around airborne versus droplet transmission of respiratory viruses: implication for infection prevention", vol. 32, No. 4, Aug. 2019, 372-379.

Tellier, Raymond , et al., "Recognition of aerosol transmission of infectious agents: a commentary", BMC Infectious Diseases, 2019, 9 pages.

Xiao, Jingyi , et al., "Nonpharmaceutical Measures for Pandemic Influenza in Nonhealthcare Settings—Personal Protective and Environmental Measures", Emerging Infectious Diseases • www.cdc.gov/eid • vol. 26, No. 5, May 2020, 967-975.

PCT/IB2021/053754 , "International Search Report and Written Opinion Received mailed Jul. 16, 2021", Jul. 16, 2021, 10 pages.

Extended European Search Report mailed on Dec. 9, 2024, for EP Application No. 21833848.1, 13 Pages.

Teilaghi et al. "Preparation as Well as Evaluation of the Nanofiber Membrane Loaded with Extract Using the Electrospinning Method", Journal of Polymers and the Environment, Springer New York LLC, US, vol. 28, No. 6, Mar. 24, 2020 (Mar. 24, 2020), pp. 1614-1625, XP037114184.

Ahmend et al., "A review on electrospinning for membrane fabrication: Challenges and applications", Desalination, Elsevier, Amsterdam, NL, vol. 356, Oct. 30, 2014 (Oct. 30, 2014), pp. 15-30, XP029115455, ISSN: 0011-9164, DOI.

Spasova et al., "Tuning the properties of PVDF or PVDF-HFP fibrous materials decorated with ZnO nanoparticles by applying electrospinning alone or in conjunction with electrospraying", Fibers and Polymers, The Korean Fiber Society, Seoul, vol. 18, No. 4, May 4, 2017 (May 4, 2017).

* cited by examiner

100/102

108

Additives 106

Nanofiber 104

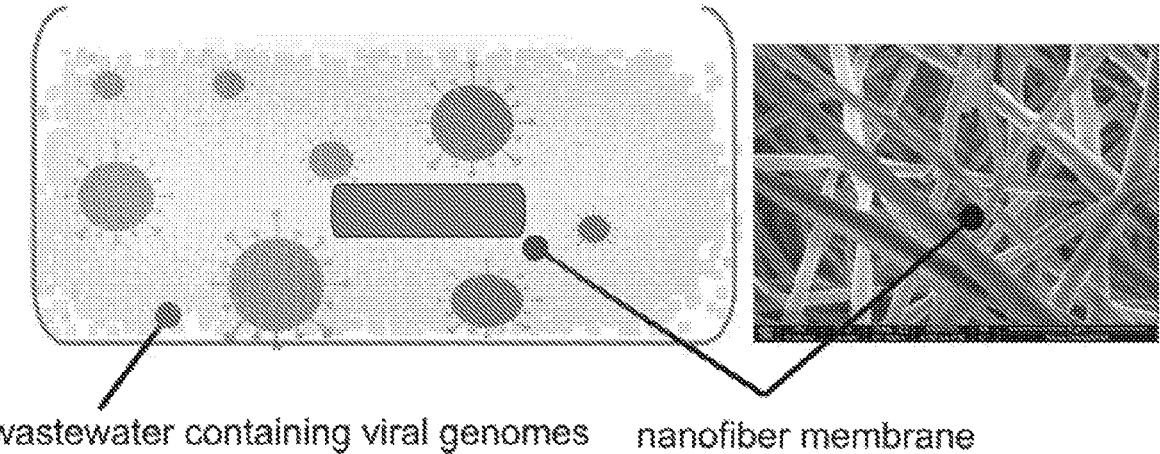
wastewater containing viral genomes  nanofiber membrane
FIG. 5A     FIG. 5B

MULTIFUNCTIONAL FILTER MATERIALS

BACKGROUND

Acute respiratory virus illnesses (ARIs) spread between humans through direct or indirect contact, by respiratory droplets and fine-particle aerosols. Respiratory droplets may include larger droplets that are present near the host, as well as coarse aerosols with an aerodynamic diameter of >about 5 μm. Fine-particle aerosols may include droplets and droplet nuclei with an aerodynamic diameter of ≤about 5 μm. Although hand hygiene and use of face masks, primarily targeting contact and respiratory droplet transmission, have been suggested as important mitigation strategies against influenza virus transmission, not much is known about the relative importance of these modes in the transmission of other common respiratory viruses. For example, uncertainty remains as to the transmission of COVID-19.

A face mask is an essential requirement for the general population in most countries, especially when they are struggling to cope with a deadly virus like COVID-19. In general, a face mask is a loose-fitting, disposable protective wear for creating a physical barrier between the mouth and nose of the user and the contaminants in the surrounding environment. Examples include isolation, surgical, dental, or medical procedure masks. In several cases, the authorities have recommended use of said masks (or similar masks) in public transport. Despite being useful, these masks do have some challenges, such as poor side fit and short life cycle (about 8 h). Respirators, on the other hand, are personal air purifiers, which are designed for protecting the wearer from inhaling dangerous elements such as toxic chemicals and infectious particles. These respirators are costlier, bulky, and highly uncomfortable. Besides, respiratory viruses can live up to 72 h on different surfaces. Hence, a bunch of bacterial/viral particles can be trapped proximal to the wearer's nose and mouth, subjecting the wearer and others to potential infection. Therefore, a mask that is both easy to use and can disinfect the disease-causing agents would overcome many of these and other challenges.

SUMMARY

According to one or more aspects of the invention, a filter material may include an electrospun nanofiber membrane and an active nanomaterial agent incorporated into the electrospun nanofiber membrane, wherein the electrospun nanofiber membrane filters disease-causing agents and the wherein the active nanomaterial agent degrades disease-causing agents.

According to one or more aspects of the invention, a face mask and/or respirator may include a filter material, wherein the filter material includes an electrospun nanofiber membrane and an active nanomaterial agent incorporated into the electrospun nanofiber membrane, wherein the electrospun nanofiber membrane filters disease-causing agents and the wherein the active nanomaterial agent degrades disease-causing agents.

BRIEF DESCRIPTION OF THE DRAWINGS

FIGS. 5A-5B are schematic illustrations for demonstrating the rejection of virus: (A) The membrane was stirred well and dipped for 24 hours in wastewater containing virus (B) SEM image of the dipped PL-ABG membrane, showing no attachment of the viral particles onto the membrane surface, according to one or more embodiments of the invention.

DETAILED DESCRIPTION

Definitions

Figure 1:
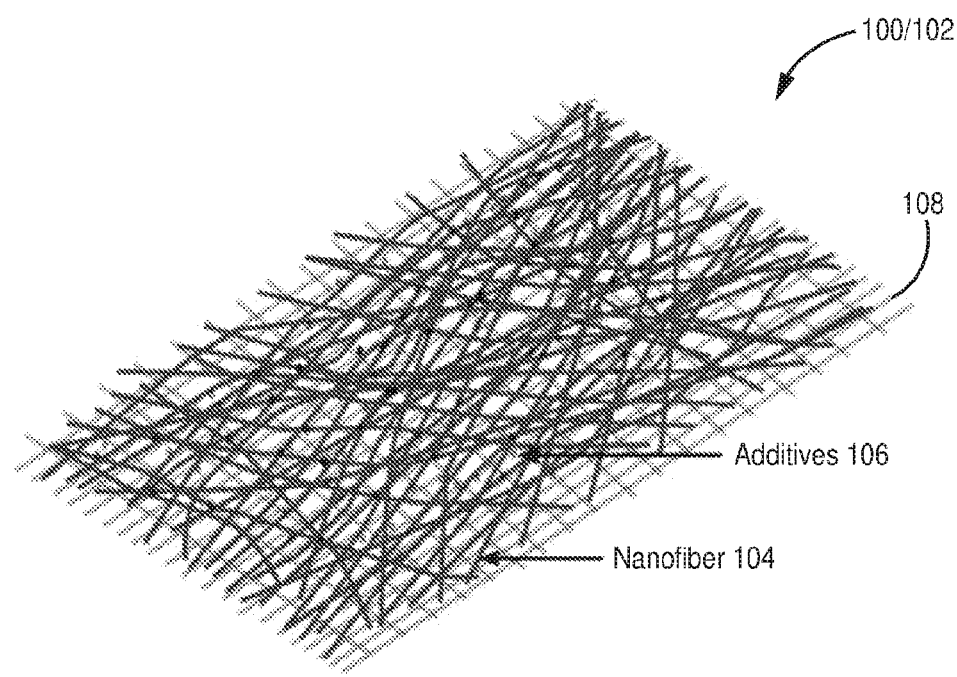
FIG. 1 is a schematic diagram of a filter material, according to one or more embodiments of the present disclosure.
Figures 2A, 2B, 2C, 2D:
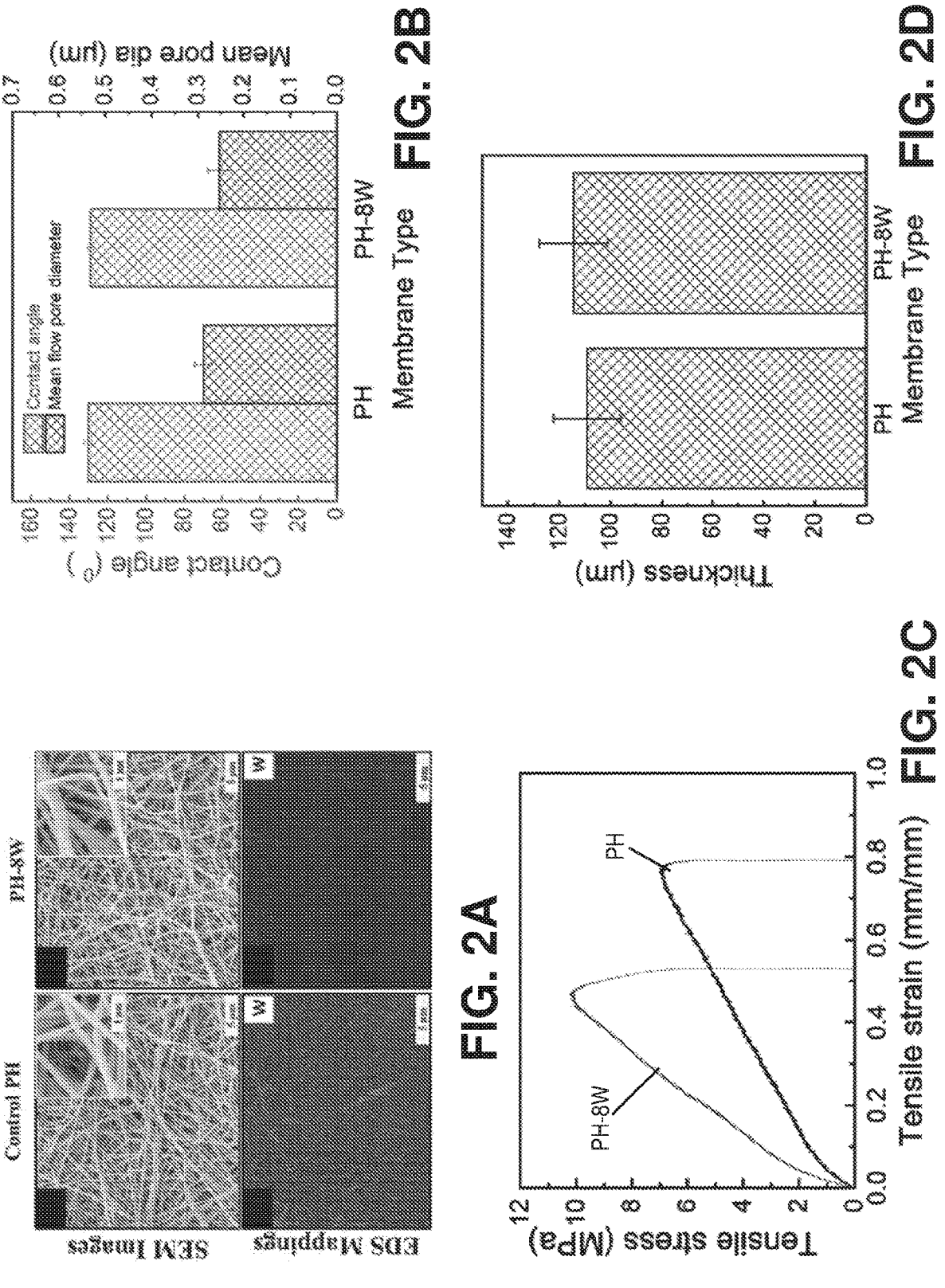
FIGS. 2A-2D are (A) SEM images and EDAX mapping of the control and modified membranes, (B) contact angle, and mean pore size of the control and WO$_3$-loaded electrospun nanofiber membranes (ENMs), (C) tensile strength and, (D) thickness of the control and WO$_3$-loaded ENMs, according to one or more embodiments of the present disclosure.

As used herein, the term "disease-causing agent" refers to any substance capable of causing disease, such as a pathogen, and thus shall be construed broadly. Examples of disease-causing agents include, without limitation, virus, bacterium, protozoan, prion, viroid, fungus, parasites, organisms, microbes, algae, and the like. Coronaviruses, influenza, and the like are specific non-limiting examples of disease-causing agents. The means by which the disease-causing agent may cause infection or disease is not limited.

As used herein, the term "porosity" refers to a void volume fraction of a membrane. The porosity may be defined as the volume of pores divided by the total volume of the membrane.

As used herein, the term "bacterial filtration efficiency" or "BFE" refers to the efficiency of a material as a barrier to bacteria penetration. For example, bacterial filtration efficiency may refer to a measure of a mask material's resistance to penetration of bacteria. Results may be reported as percent efficiency and may correlate with the ability of the material to resist bacterial penetration. In general, higher values of bacterial filtration efficiency usually indicate superior removal efficiency in comparison to lower values of bacterial filtration efficiency.

As used herein, the term "breathability" refers to the air permeability of a material, such as a filter material and/or a face mask, measured by a differential pressure across the material. The differential pressure may refer to the difference in pressure between, or across, two points. For example, to determine differential pressure, a specific volume of compressed air may be passed through a fixed area of a membrane and the pressure drop across the fixed area of the membrane may be determined. A lower pressure drop is desired as the lower pressure drop indicates the material is more breathable than materials having higher pressure drops.

As used herein, the term "biocompatibility" refers to the quality of being, or capability to be, accepted in a specific living environment without adverse side effects.

As used herein, the term "biodegradable" refers to the quality of being, or capability to be, degraded.

DISCUSSION

The present disclosure provides versatile and robust filter materials for filtering and/or degrading a wide array of disease-causing agents. For example, the filter materials may be used in antiviral/antibacterial face masks and/or respirators to protect against and reduce the transmission of diseases, such as influenza and coronavirus, among others. The filter materials may include novel electrospun nanofiber membranes and active nanomaterial agents. The electrospinning usually yields nanofibers of high surface area and porosity, narrow pore size distribution, excellent mechanical strength, and tunable nanofiber structure. Thus, electrospinning PVDF-HFP or PLA solutions blended with antiviral agents produced robust hydrophobic nanofibers with enhanced breathability and antimicrobial properties, and may be directly incorporated into facemasks and/or respirators. For example, the electrospun nanofiber membranes have small pore size and thus may be used as protection against biological agents such as bacteria. In addition, while conventional respirators usually have high pressure drops, making them difficult to breathe, the electrospun nanofiber membranes disclosed herein are effective in removing contaminants with relatively low pressure drops. The filter materials may also be prepared from bio-based materials to produce face masks which are completely biodegradable and/or biocompatible.

Face masks and/or respirators including the filter materials disclosed herein provide numerous advantages over conventional face masks and respirators. For example, in addition to the above mentioned-properties, the filter materials may have one or more of the following properties: low air filtration resistance due to their high porosity, high rejection of microbial contaminants due to the small mean pore sizes, and excellent antibiotic (e.g., especially antimicrobial and/or antiviral) performance due to the presence of active nanomaterial agents, such as for example $WO_3$, black seeds, anise, and glycerol monolaurate and zinc. Furthermore, the functionality of the filter materials may not be solely based on conventional electrostatic forces between the mask and the disease-causing agents, contaminants, etc. Rather, in some embodiments, the filter materials may function via size exclusion (e.g., by the electrospun nanofiber membrane) and/or via degradation of the structures of the disease-causing agents. For instance, the membrane envelope of the virus may be disintegrated and/or degraded when in contact with the active agents such as black seed, Star Anise, GML+Zn, etc. In some embodiments, the $WO_3$ nanomaterials can function as a catalyst in the presence of light, that can then disintegrate the microbial structures. Accordingly, the filter materials may retain their performance for extended periods of time, including for example and without limitation after being washed multiple times, among other things.

Embodiments of the present disclosure thus describe filter materials. The filter materials may include one or more of an electrospun nanofiber membrane and an active nanomaterial agent associated with the electrospun nanofiber membrane. The filter material may include a single layered electrospun nanofiber membrane, or said material may include a multi-layered electrospun nanofiber membrane (e.g., an electrospun nanofiber membrane having one or more layers, which may for example be provided in the form of nanofiber mats, etc.). The term associated with may refer to an active nanomaterial agent that is provided on, blended with, embedded in, incorporated with, integrated with, disposed on, deposited on, bonded to, interacting with, or otherwise associated with the electrospun nanofiber membrane. For example, in some embodiments, the active nanomaterial agent is provided on one or more surfaces of the electrospun nanofiber membrane. In some embodiments, the active nanomaterial agent is blended with the electrospun nanofiber membrane to provide maximum surface exposure.

In some embodiments, the filter materials further include a coating, such as a polydopamine coating (e.g., a mussel-inspired polydopamine coating) and/or coatings including agents like biocidal agents, such as 1-chloro-2,2,5,5-tetramethyl-4-imidazolidinone, and the like. The polydopamine coating may enhance the usability and performance of the membranes by, for example, improving the antimicrobial and/or antiviral activity thereof. For example, the polydopamine coating may be used for surface functionalization of one or more of the electrospun nanofiber membrane and active nanomaterial agent. For instance, the polydopamine coating on PVDF-HFP nanofiber membrane may be applied to make the membrane superhydrophilic and superoleophobic. These membranes may be used in high-flux gravity-driven oil/water separations, solar evaporation of seawater, and/or catalytic degradation of emerging contaminants from wastewater, among other things. In some embodiments, the filter materials further include a support, such as cotton, polypropylene, among others. Other components, layers, and coatings may be employed herein without departing from the scope of the present invention.

As mentioned above, the filter materials may include an electrospun nanofiber membrane. The electrospun nanofiber membranes disclosed herein (also referred to herein as ENMs) may advantageously have high surface area and porosity, excellent mechanical strength, enhanced breathability, antimicrobial properties, and tunable nanofiber structures. The electrospun nanofiber membranes may be used to filter various disease-causing agents, including without limitation infectious respiratory virus droplets, biological agents such as bacteria and the like, carrier materials on which disease-causing agents may be transmitted such as pollutants, contaminants, and particulate matter, among others. For example, the electrospun nanofiber membranes may be used to filter respiratory droplets, including larger droplets near a host or subject and coarse aerosols, having aerodynamic diameters of about 5 m or greater, as well as fine-particle aerosols, including droplets and droplet nuclei, having aerodynamic diameters of about 5 μm or less. In addition, the tunable nanofiber structure permits control over the mean pore size of the electrospun nanofiber membrane. Accordingly, a wide range of disease-causing agents may be selectively targeted and filtered, or entrapped, by modulating the mean pore size of the electrospun nanofiber membrane.

The electrospun nanofiber membrane may include one or more polymeric materials such as, for example and without limitation, polymers, biopolymers, oligomers, monomers, macromers, and the like. The polymeric materials may optionally be crosslinked (e.g., may include crosslinked polymeric materials). In some embodiments, the electrospun nanofiber membrane includes one or more of polyvinylidene fluoride-co-hexafluoropropylene (PVDF-HFP), and polylactic acid (PLA). For example, in some embodiments, the electrospun nanofiber membrane includes PVDF-HFP. In some embodiments, the electrospun nanofiber membrane includes PLA. In some embodiments, the electrospun nanofiber membrane includes one or more of polymethylmethacrylate (PMMA), polyvinyl alcohol (PVA), polyvinyl phenol (PVP), polyvinylchloride (PVC), polyvinylcarbazole, polyvinylidene fluoride (PVDF), polyacrylonitrile (PAN), polylactic acid (PLA), hexafluoropropylene (HFP), tetrahydro perfluorooctyl acrylate, silica, nanocrystalline cellulose, alginate, polyethylene oxide (PEO), polypropylene, starch (e.g., amylose, amylopectin, etc.), chitosan, hemicellulose, lignin, cellulose, chitin, dextran, polyhydroxyalkanoate, fibrin, cyclodextrin, protein (e.g., soy proteins, etc.), polysaccharides (e.g., pectin, etc.), and the like.

In some embodiments, the electrospun nanofiber membrane (and/or the filter material) includes polymeric materials having a molecular weight of about 10,000 Da, about 20,000 Da, about 30,000 Da, about 40,000 Da, about 50,000 Da, about 60,000 Da, about 70,000 Da, about 80,000 Da, about 90,000 Da, about 100,000 Da, about 200,000 Da, about 300,000 Da, about 400,000 Da, about 500,000 Da, about 600,000 Da, about 700,000 Da, about 800,000 Da, about 900,000 Da, about 1,000,000 Da, about 2,000,000 Da, about 3,000,000 Da, or 4,000,000 Da or higher, or any incremental value or subrange between the provided molecular weights.

In some embodiments, the electrospun nanofiber membrane (and/or the filter material) has a fiber diameter between about 1 nm to about 1000 nm, or higher, such as about 5 nm, about 50 nm, about 100 nm, about 150 nm, about 200 nm, about 250 nm, about 300 nm, about 350 nm, about 400 nm, about 450 nm, about 500 nm, about 550 nm, about 600 nm, about 650 nm, about 700 nm, about 750 nm, about 800 nm, about 850 nm, about 900 nm, about 950 nm, about 1000 nm or higher, or any incremental value or subrange between the provided fiber diameters.

In some embodiments, the electrospun nanofiber membrane (and/or the filter material) has a mean pore size (e.g., pore diameter) which may be the same or similar in size to the fiber diameter, or it may be different. For example, in some embodiments, the mean pore diameter of the electrospun nanofiber membranes may be at least about 1 nm or greater. In some embodiments, the mean pore diameter is in the range of greater than 0 μm to about 10 μm, such as about 20 nm, about 30 nm, about 40 nm, about 50 nm, about 60 nm, about 70 nm, about 80 nm, about 90 nm, about 0.1 μm, about 0.2 μm, about 220 nm, about 0.3 μm, about 0.4 μm, about 0.5 μm, about 0.6 μm, about 0.7 μm, about 0.8 μm, about 0.9 μm, about 1.0 μm, or any incremental value or subrange between the provided mean pore diameters. In some embodiments, the mean pore diameter is about 5 nm to about 350 nm, about 5 nm to about 60 nm, about 60 nm to about 130 nm, or any incremental value or subrange between the provided mean pore diameters. In some embodiments, the electrospun nanofiber membrane has an average pore diameter of about 1.7 μm or less.

In some embodiments, the electrospun nanofiber membrane (and/or the filter material) has a porosity ranging from about 20% to about 70%, such as for example a porosity of about 20%, about 25%, about 30%, about 35%, about 40%, about 45%, about 50%, about 55%, about 60%, about 65%, about 70%, or any incremental value or subrange between the provided porosities.

In some embodiments, the electrospun nanofiber membrane (and/or the filter material) has a hydrophobic surface. For example, in some embodiments, the filter materials may have a water contact angle of 90° or greater. For example, in some embodiments, the filter materials have a water contact angle of about 90°, about 95°, about 100°, about 105°, about 110°, about 115°, about 120°, about 125°, about 130°, about 135°, about 140° or greater, or any incremental value or subrange between the provided water contact angles. In some embodiments, the filter materials have a water contact angle of about 130°. In some embodiments, the filter materials have a water contact angle not greater than about 150°. In other embodiments, the filter materials have a water contact angle of at least about 150°. In yet other embodiments, the filter materials have a water contact angle of less than about 90° and thus is considered to have a hydrophilic surface.

In some embodiments, the electrospun nanofiber membrane and/or the filter material has a thickness in the range of about 20 μm to about 200 μm or greater, or any incremental value or subrange between the provided thicknesses. For example, in some embodiments, the filter material shave a thickness of about 20 μm, about 50 μm, about 80 μm, about 85 μm, about 90 μm, about 100 μm, about 105 μm, about 110 μm, about 115 μm, about 120 μm, or greater.

In addition, various disease-causing agents, such as viral particles, bacterial particles, and the like, may survive on surfaces for extended periods of time (e.g., about 72 hours). While many—and, in some cases, all—disease-causing agents are rejected by the electrospun nanofiber membrane, at least some of the disease-causing agents may become entrapped, captured, and/or sorbed (e.g., adsorbed, absorbed) on or within the electrospun nanofiber membrane, unnecessarily extending a subject's exposure to the potentially infectious particles. Accordingly, to reduce the subject's exposure to said particles, the filter materials may further include an active nanomaterial agent. The active nanomaterial agent may degrade, or destroy, any disease-causing agents entrapped on a surface of the electrospun nanofiber membrane and/or within the electrospun nanofiber membrane (e.g., entrapped below a surface of said membrane). In this way, the active nanomaterial agents may confer antibiotic, antibacterial, antimicrobial, antiviral, antifungal, antipathogenic, antiparasitic, etc. properties to the filter materials and may be used as such (e.g., as one or more of antibiotic, antibacterial, antimicrobial, antiviral, antifungal, antipathogenic, antiparasitic, etc. materials). These and other details of the filter materials and various other embodiments will be described in more detail below.

The active nanomaterial agents may include a nanomaterial that provides at least some protection against disease-causing agents. The activity of the active nanomaterial agents may be in the form of degradation, disinfection, desorption, and/or destruction of said disease-causing agents, among others. In some embodiments, for example, the active nanomaterial agents act against the disease-causing agents via, for example, catalytic degradation. In addition, the nanomaterial may be provided in any form including, for example and without limitation, nanoparticles, nanosheets, nanotubes, nanorods, nanoribbons, among other nanostructures. In some embodiments, the nanomaterial agents are provided as nanoparticles. In addition, the active nanomaterial agents may be used in combination with other materials, including other active nanomaterial agents. For example, in some embodiments, the active nanomaterial agents include coated nanoparticles and/or functionalized nanoparticles. For example, in some embodiments, the active nanomaterial agents may include nanoparticles coated with a polydopamine coating, such as a mussel-inspired polydopamine coating. In other embodiments, the polydopamine coating may be applied to the electrospun nanofiber membrane, optionally in combination with a polydopamine coating applied to the active nanomaterial agents.

In some embodiments, the active nanomaterial agents include one or more of tungsten oxide ($WO_3$), black seeds, star anise, glycerol monolaurate, zinc, copper, silver, titanium oxide ($TiO_2$), zinc oxide (ZnO), Ag, silicon dioxide ($SiO_2$), CuO, rGO/$TiO_2$, $Fe_3O_4$, metal-organic framework, zirconium oxide ($ZrO_2$), $SnO_2$, aluminium oxide ($Al_2O_3$), aluminium phosphate ($AlPO_4$), aluminium hydrogen phosphate ($Al_2(HPO_4)_3$), aluminium dihydrogen phosphate (Al $(H_2PO_4)_3$), calcium oxide (CaO), calcium carbonate (CaCO$_3$), calcium silicate (CaSiO$_4$), calcium phosphate (Ca$_3$(PO$_4$)$_2$), calcium hydrogen phosphate (CaHPO$_4$), calcium dihydrogen phosphate (Ca(H$_2$PO$_4$), silicon nitride (SiN), silicon carbide (SiC), boron nitride (BN), tungsten carbide (WC), and titanium carbonitride (TiC$_{0.5}$N$_{0.5}$), wherein the active nanomaterial agents may be provided in the form of a nanomaterial (e.g., nanoparticles) and/or coatings on said nanomaterial, among other configurations. In some embodiments, for example, the active nanomaterial agent includes tungsten oxide (WO$_3$) nanoparticles. In some embodiments, the active nanomaterial agent includes one or more of black seeds, star anise, and glycerol monolaurate and zinc. These shall not be limiting as any combination of the aforementioned may be utilized herein without departing from the scope of the present invention.

In some embodiments, the active nanomaterial agents achieve a certain log reduction of one or more disease-causing agents within a select time period. For example, in some embodiments, the active nanomaterial agents may achieve 2 log reductions, 3 log reductions, 4 log reductions, 5 log reductions, or 6 log reductions or greater of the disease-causing agent, within about is to about 3 h or longer.

In some embodiments, the filter materials have a filtration efficiency of up to about 100%. In some embodiments, the filter materials reject about 100% of disease-causing agents. In some embodiments, the filter materials have a filtration efficiency of at least about 80% with respect to the disease-causing agents disclosed herein. For example, in some embodiments, the filter material has a filtration efficiency of about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, about 99%, about 100%, or any incremental value or subrange between the provided efficiencies.

In some embodiments, a differential pressure of the filter material is low to permit sufficient breathability of a subject when incorporated into and/or worn as a face mask. In some embodiments, the differential pressure across the filter material is about 80 Pa cm$^{-2}$ or less. For example, in some embodiments, the differential pressure is about 70 Pa cm$^{-2}$ or less, about 65 Pa cm$^{-2}$ or less, about 60 Pa cm$^{-2}$ or less, about 55 Pa cm$^{-2}$ or less, about 50 Pa cm$^{-2}$ or less, about 45 Pa cm$^{-2}$ or less, about 40 Pa cm$^{-2}$ or less, about 35 Pa cm$^{-2}$ or less, about 30 Pa cm$^{-2}$ or less, about 25 Pa cm$^{-2}$ or less, about 20 Pa cm$^{-2}$ or less, or about 15 Pa cm$^{-2}$ or less, or any incremental value or subrange between the provided differential pressures. In some embodiments, the differential pressure is between about 60 Pa cm$^{-2}$ and about 65 Pa cm$^{-2}$, about 30 Pa cm$^{-2}$ to about 40 Pa cm$^{-2}$, about 30 Pa cm$^{-2}$ to about 35 Pa cm$^{-2}$, about 32 Pa cm$^{-2}$ to about 37 Pa cm$^{-2}$, or any incremental value or subrange between the provided ranges, inclusive.

In some embodiments, the filter material is one or more of an antibiotic filter material, an antibacterial filter material, an antimicrobial filter material, an antiviral filter material, an antifungal filter material, an antipathogenic filter material, an antiparasitic filter material, a biocompatible filter material, and a biodegradable filter material. In some embodiments, the filter material is biocompatible. In some embodiments, the filter material is biodegradable. In some embodiments, the filter material includes biomaterials, such as biopolymers. In some embodiments, the filter material is 100% biodegradable and/or biocompatible.

In some embodiments, the filter material includes an electrospun poly(vinylidene fluoride-co-hexafluoropropylene) (PVDF-HFP) nanofiber membrane (ENMs) and an active nanomaterial agent, wherein the active nanomaterial agent includes an antimicrobial material. In some embodiments, the antimicrobial material includes tungsten oxide (WO$_3$) nanoparticles. In some embodiments, the WO$_3$ nanoparticles are incorporated into the electrospun PVDF-HFP nanofiber membrane. For example, in some embodiments, the filter material includes WO$_3$ nanoparticles incorporated into an electrospun PVDF-HFP nanofiber membrane. In some embodiments, said filter material is not biodegradable. In some embodiments, the tungsten oxide nanoparticles are used as an antimicrobial material.

In some embodiments, the filter material includes a biopolymer. For example, in some embodiments, the filter material includes a biopolymer, such as polylactic acid (PLA). In some embodiments, one or more biomaterials with unique properties are incorporated into the biopolymer. For example, in some embodiments, the one or more biomaterials include one or more of black seeds, star anise, and glycerol monolaurate and zinc (GML+Zn). In some embodiments, one or more biomaterials are incorporated into the biopolymer in a certain composition and ratio such as 1:1:1, 2:1:2, 1:1:2 etc. (star anise:black seed:GML+Zn) in order to obtain a homogeneous blend solution. In some embodiments, black seeds, star anise, and GML+Zn are incorporated at a certain composition and a certain ratio into a biopolymer, such as polylactic acid, to form the filter material including PLA and black seeds, star anise, and glycerol monolaurate and zinc (collectively, "ABG"). In some embodiments, the filter material is a completely biodegradable and/or biocompatible antiviral nanofiber membrane fabricated on 100% cotton fabric, via an electrospinning method.

In some embodiments, the filter material is derived from electrospun solutions including from 0.01 wt % to 80 wt. % polymer(s) and from 0.0001 wt. % to 50 wt. % active nanomaterial agent(s), wherein the wt. % polymer(s) is based on the total weight of the electrospun solution and wherein the wt. % active nanomaterial agent(s) is based on the weight of the polymer. In some embodiments, the filter material is derived from electrospun solutions including at least 0.01 wt % polymer(s), or at least any one of, equal to any one of, or between any two of 0.01, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 35, 40, 45, 50, 55, 60, 65, 70, 75, and 80 wt. %. In some embodiments, the filter material is derived from electrospun solutions including at least 0.0001 wt. % active nanomaterial(s), or at least any one of, equal to any one of, or between any two of 0.0001, 0.005, 0.010, 0.025, 0.050, 0.075, 0.10, 0.25, 0.50, 0.75, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 10, 15, 20, 25, 30, 35, 40, 45, and 50. In some embodiments, electrospun solution is subjected to a spinning time in the range of 0.01 h to 10 hr, such as for example 1-10 hr, 0.5-5 hr, 1-3 hr (e.g., 1 hr, 2 hr, 3 hr, etc.).

In some embodiments, the filter material further includes a substrate, wherein the active nanomaterial agent-containing electrospun nanofiber membrane is spun onto said substrate. In some embodiments, the substrate is a fabric, such as cotton, polyester, woven or non-woven materials, etc. In some embodiments, the substrate is a fabric, wherein the fabric is at least one of biodegradable and bio-based. For example, in some embodiments, the fabric is selected from *Libellula*, Georgette, *Perla, Alga*, Sarah, among others.

Embodiments of the present disclosure further include articles, devices, and/or apparatuses including the filter materials disclosed herein. For example, in some embodiments, a face mask is provided, wherein the face mask may include one or more of the filter materials disclosed herein. In some embodiments, the face mask further includes a porous material on opposing sides of the filter material. For example, the porous material may be provided as layers or layered materials which either partially or completely enclose the filter material. The porous material may include polypropylene. For example, in some embodiments, the porous material includes porous non-woven meshes, such as porous non-woven polypropylene meshes. In some embodiments, the porous material includes fabric, such as cotton, polyester, polyester blends, linen, athletic materials (e.g., moisture wicking materials), and the like. One example of a face mask is presented in FIG. 1, which is a schematic diagram of at least a portion of a face mask 100, according to one or more embodiments of the invention. As shown in FIG. 1, the face mask may include a filter material 102, wherein the filter material 102 includes an electrospun nanofiber membrane 104 and an active nanomaterial agent 106 associated with the electrospun nanofiber membrane; and a porous, optionally non-woven, mesh 108 on opposing sides of the filter material 102 (although only one side of the porous material is shown in the illustrated embodiment presented in FIG. 1).

In some embodiments, the face mask and/or filter material is completely biodegradable and/or biocompatible. This is advantageous to reduce the millions of discarded face masks which are piling up around the world and worsening the pollution load and endangering various organisms. The face masks (and/or filter materials) being 100% biodegradable and biocompatible promote reduction of the environmental burden associated with the improper disposal of conventional masks into the environment. Furthermore, the use of only bio-based materials in face masks and/or filter materials confers other advantages such as compatibility with human skin. The support material may include, for example, pure cotton, and accordingly, the masks may be easily fine-tuned by varying designs as per subjects' requirements. Furthermore, the masks may be prepared to have a pleasant fragrance as well, to provide subjects with greater enjoyment. The face masks may provide greater advantages especially in places such as wastewater treatment plants, oil and gas industry, waste industries, landfills, chemical and/or petrochemical industry, health sector, transportation, desalination, educational institutions, energy sector, and the like.

In some embodiments, a respirator is provided, wherein the respirator includes one or more of the filter materials disclosed herein. The face masks and/or respirators may include any other components, including conventional components, in addition to the filter material, without departing from the scope of the present invention. In other embodiments, the filter materials may be used in applications other than face masks and/or respirators. For example, due to their unique characteristics, the filter materials and/or nanofiber membranes may, upon suitable modifications if necessary, may be excellent for various other applications, including, for example and without limitation, gravity-driven oil/water separation, photothermal membrane distillation (desalination), heavy metal removal from water and wastewater, gloves, shoes, sprays, air filters in HVAC systems, textile accessories made of antimicrobial/antiviral fabrics for transportation vehicles (e.g., cars, airplanes, trains, buses, etc.), seats, chairs, sofas, construction sites, healthcare, protective wear, and the like.

Embodiments of the present disclosure further include methods of making filter materials, including any of the filter materials disclosed herein. The filter materials may be prepared by combining one or more active nanomaterial agents and/or one or more active nanomaterial agent precursors, at a select ratio, with one or more solvents. In some embodiments, the one or more active nanomaterial agents and/or the precursors thereof are suspended in one or more solvents. The suspension may be formed by agitating, stirring, sonicating, mixing, and the like. The solvents are not particularly limited and may be selected from, for example and without limitation, one or more of acetone, dimethyl acetamide, dimethyl formamide, dichloromethane, toluene, tetrahydrofuran, hexane, benzene, and the like. A select mass of a polymeric material or other precursor to the electrospun nanofiber membrane may be added to the suspension and dissolved by mixing, stirring, and the like. The amount (e.g., mass, volume, etc.) of the active nanomaterial agents and/or precursors thereof, as well as the polymeric material and/or other precursor, may be selected such that the concentration of the active nanomaterial agent is in the range of about greater than 0 wt. % to about 5 wt. %, wherein the weight percentage is based on the weight of the polymeric material. In some embodiments, the resulting mixture is kept idle (e.g., allowed to sit) to ensure removal of bubbles, among other things, before being electrospun to form the resulting filter material including active nanomaterial agents incorporated into/onto an electrospun nanofiber membrane. The selection of one or more solvents may be important for optimizing the electrospinning as it can influence the spinnability of the polymeric blend solution and the characteristics of the formed nanofibers. In some embodiments, appropriate mixture of solvents may be selected so as to facilitate their rapid evaporation within the electrospinning chamber during spinning.

In some embodiments, the solution to be electrospun includes from 0.01 wt % to 80 wt. % polymer(s) and from 0.0001 wt. % to 50 wt. % active nanomaterial agent(s), wherein the wt. % polymer(s) is based on the total weight of the solution and wherein the wt. % active nanomaterial agent(s) is based on the weight of the polymer. In some embodiments, the solution to be electrospun includes at least 0.01 wt % polymer(s), or at least any one of, equal to any one of, or between any two of 0.01, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 35, 40, 45, 50, 55, 60, 65, 70, 75, and 80 wt. %. In some embodiments, the solution to be electrospun includes at least 0.0001 wt. % active nanomaterial(s), or at least any one of, equal to any one of, or between any two of 0.0001, 0.005, 0.010, 0.025, 0.050, 0.075, 0.10, 0.25, 0.50, 0.75, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 10, 15, 20, 25, 30, 35, 40, 45, and 50. In some embodiments, the solution to be electrospun includes is subjected to a spinning time in the range of 0.01 h to 10 hr, such as for example 1-10 hr, 0.5-5 hr, 1-3 hr (e.g., 1 hr, 2 hr, 3 hr, etc.).

In some embodiments, a select ratio of nanomaterials selected from $WO_3$, Black seeds, Star Anise, GML+Zn, and combinations thereof are suspended in a mixture of solvents selected from acetone, dimethyl acetamide, dimethyl formamide, dichloromethane, and combinations thereof, via bath sonication for about 30 minutes. A specific mass of the polymer selected from PVDF-HFP, PLA, and combinations thereof, may subsequently be added to the above suspension and dissolved by mixing in a magnetic stirrer for about 8 h.

In some embodiments a polymer dope solution, such as a polylactic acid dope solution is used and added to the above suspension. The solution may then be kept idle for about 3 h to remove any bubbles and electrospun (e.g., using a Nanon-01A (MECC Japan) electrospinning set up fitted with a rotating aluminum drum collector). In embodiments in which biodegradable membranes are fabricated, the drum collector may be wrapped with cotton fabric, whereas the drum collector may be wrapped with aluminum foil for non-biodegradable membranes. The optimum electrospinning parameters such as applied voltage, feed flow rate, needle diameter, dope solution volume, and relative humidity in the chamber etc. may be selected and applied. In some embodiments, a pilot-scale electrospinning machines with multiple nozzles may be used for the mass production of nanofibers and/or for scaled-up production lines. The nanofiber membranes disclosed herein may be fabricated using such pilot-scale set-ups.

Example 1

Electrospun PVDF-HFP Nanofiber Membrane with 1 wt. % $WO_3$ (P1W)

To prepare the filter material, about 1 wt. % (based on the polymer weight) $WO_3$ nanoparticles were suspended in a mixture of solvents—including, acetone, dimethyl acetamide, dimethyl formamide, and dichloromethane—via bath sonication for about 30 minutes. About 3 g of PVDF-HFP polymer was subsequently added to the suspension and dissolved by mixing in a magnetic stirrer for about 8 h. The solution was kept idle for about 3 h to remove any bubbles before being electrospun using a Nanon-01A (MECC Japan) electrospinning set up fitted with a rotating aluminum drum collector which was wrapped with aluminum foil. The optimum electrospinning parameters were selected and applied. These parameters were set as follows: applied voltage (25 kV), feed flow rate (1 mL/h), needle internal diameter (0.838 mm), dope solution volume (30 mL), drum rotation speed (100 rpm), and relative humidity in the chamber (50%).

Example 2

Electrospun PVDF-HFP Nanofiber Membrane with 2 wt. % $WO_3$ (P2W)

To prepare the filter material, about 2 wt. % (based on the polymer weight) $WO_3$ nanoparticles were suspended in a mixture of solvents—including, acetone, dimethyl acetamide—via bath sonication for about 30 minutes. About 3 g of PVDF-HFP polymer was subsequently added to the suspension and dissolved by mixing in a magnetic stirrer for about 8 h. The solution was kept idle for about 3 h to remove any bubbles before being electrospun using a Nanon-01A (MECC Japan) electrospinning set up fitted with a rotating aluminum drum collector which was wrapped with aluminum foil. The optimum electrospinning parameters were selected and applied. These parameters were set as follows: applied voltage (25 kV), feed flow rate (1 mL/h), needle internal diameter (0.838 mm), dope solution volume (30 mL), drum rotation speed (100 rpm), and relative humidity in the chamber (50%).

Example 3

Electrospun PVDF-HFP Nanofiber Membrane with 4 wt. % $WO_3$ (P4W)

To prepare the filter material, about 4 wt. % (based on the polymer weight) $WO_3$ nanoparticles were suspended in a mixture of solvents—including, acetone, dimethyl acetamide, dimethyl formamide, and dichloromethane—via bath sonication for about 30 minutes. About 3 g of PVDF-HFP polymer was subsequently added to the suspension and dissolved by mixing in a magnetic stirrer for about 8 h. The solution was kept idle for about 3 h to remove any bubbles before being electrospun using a Nanon-01A (MECC Japan) electrospinning set up fitted with a rotating aluminum drum collector which was wrapped with aluminum foil. The optimum electrospinning parameters were selected and applied. These parameters were set as follows: applied voltage (25 kV), feed flow rate (1 mL/h), needle internal diameter (0.838 mm), dope solution volume (30 mL), drum rotation speed (100 rpm), and relative humidity in the chamber (50%).

Example 4

Electrospun PVDF-HFP Nanofiber Membrane with 8 wt. % $WO_3$ (P8W)

To prepare the filter material, about 8 wt. % (based on the polymer weight) $WO_3$ nanoparticles were suspended in a mixture of solvents—including, acetone, dimethyl acetamide—via bath sonication for about 30 minutes. About 3 g of PVDF-HFP polymer was subsequently added to the suspension and dissolved by mixing in a magnetic stirrer for about 8 h. The solution was kept idle for about 3 h to remove any bubbles before being electrospun using a Nanon-01A (MECC Japan) electrospinning set up fitted with a rotating aluminum drum collector which was wrapped with aluminum foil. The optimum electrospinning parameters were selected and applied. These parameters were set as follows: applied voltage (25 kV), feed flow rate (1 mL/h), needle internal diameter (0.838 mm), dope solution volume (30 mL), drum rotation speed (100 rpm), and relative humidity in the chamber (50%).

Example 5

Characterization of the Electrospun PVDF-HFP Nanofiber Membranes with $WO_3$ Nanoparticles The SEM microstructures, EDS mapping, contact angle, mean pore diameter, mechanical strength, and membrane thickness of the filter materials from Examples 1 to 4 were obtained. More specifically, FIGS. 2A-2D are (A) SEM images and EDAX mapping of the control and modified membranes; (B) a graphical view of the contact angle and mean pore size of the control and $WO_3$ loaded electrospun nanofiber membranes, (C) a graphical view of the tensile strength, and (D) a graphical view of the thickness of the control and $WO_3$ loaded electrospun nanofiber membranes, according to one or more embodiments of the invention. As shown, the filter materials including the electrospun PVDF-HFP nanofiber membranes and $WO_3$ nanoparticles are excellent candidates for use in facemasks and provide numerous advantages when used in facemasks in comparison to conventional filter materials.

Example 6

Figure 3:
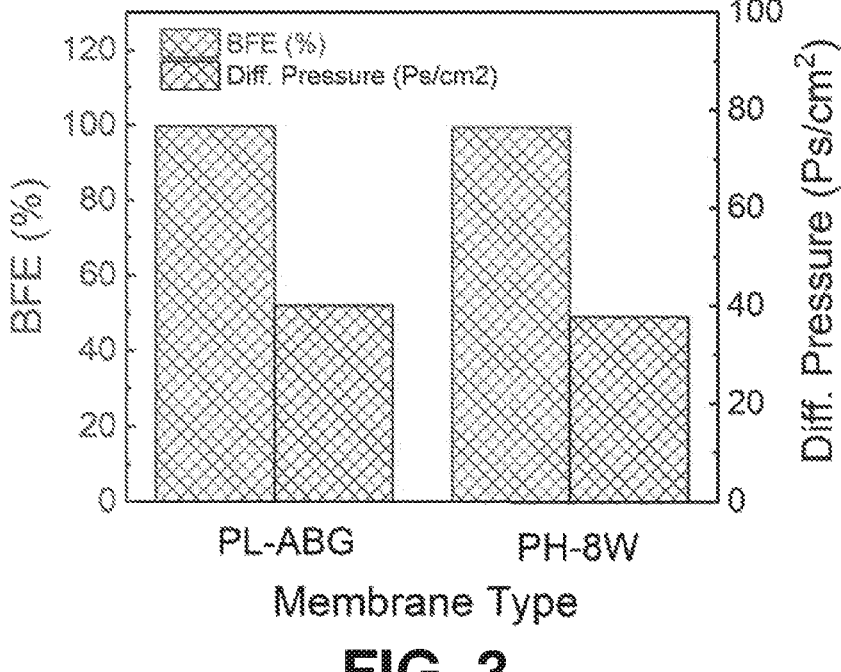
FIG. 3 is a graphical view of the differential pressure and bacterial removal efficiency of the PVDF-HFP/WO$_3$ nanofiber membranes, according to one or more embodiments of the present disclosure.
Figures 4A, 4B:
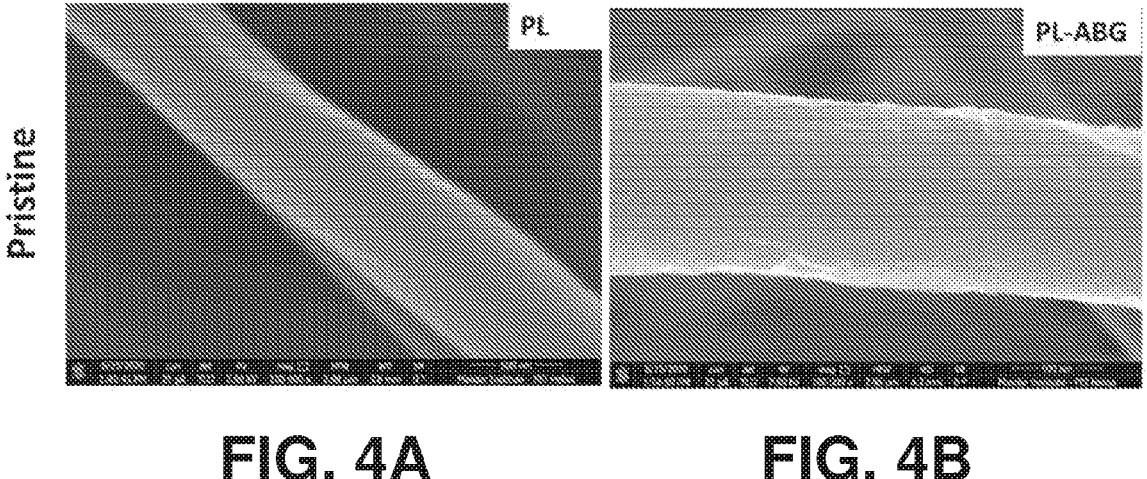
FIGS. 4A-4D are SEM images of the pristine and wastewater treated membranes, showing lower adsorption of viral/microorganisms on the membranes containing antiviral nanomaterials, according to one or more embodiments of the present disclosure.
Figures 4C, 4D:
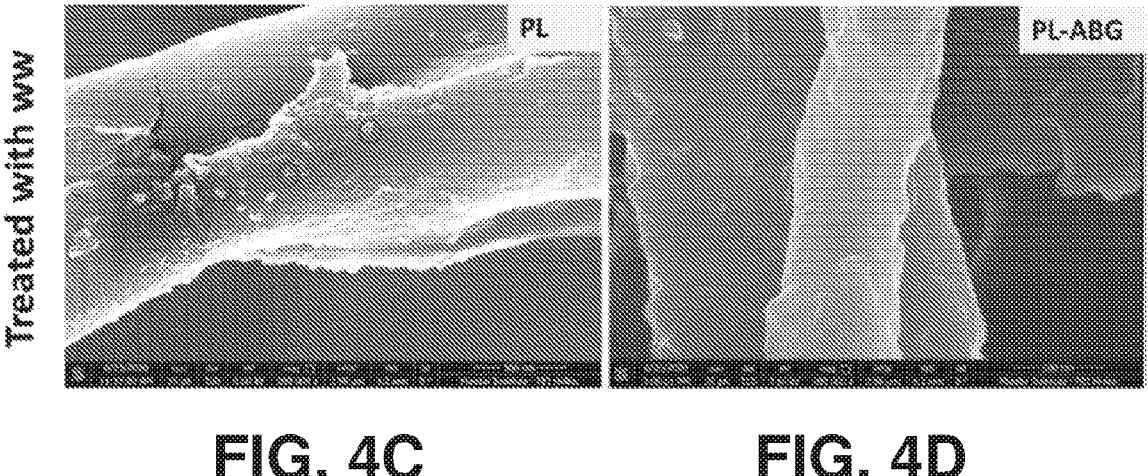

Performance of the Electrospun PVDF-HFP Nanofiber Membranes with $WO_3$ Nanoparticles The following tests were conducted to test the suitability of the filter materials from Examples 1 to 4 as mask materials. The bacterial filtration efficiency was tested and is a measure of a mask material's resistance to the penetration of bacteria. The results were reported as a percent efficiency and correlate with the ability of the material to resist bacterial penetration. Higher numbers in this test indicate better removal efficiency. The differential pressure was also tested and is essentially the difference in pressure between two given points. A specific volume of the compressed air was passed through a fixed area of the membrane and the pressure drop across a certain area of the membrane was determined. In general, a low-pressure drop is desired for a highly breathable membrane. The results are presented in FIG. 3, which is a graphical view of the differential pressure and bacterial removal efficiency of the PVDF-HFP-WO$_3$ nanofiber membranes, according to one or more embodiments of the present disclosure.

Example 7

Biodegradable and Biocompatible Membrane Electrospun PLA Nanofiber Membrane with Biomaterials To prepare the electrospun PLA nanofiber membrane, a 2:1:2 ratio of black seeds, star anise, and glycerol monolaurate and zinc (GML+Zn) were suspended in a mixture of solvents—including, dimethyl formamide, and dichloromethane—via bath sonication for about 30 minutes. About 3 g of PLA polymer was subsequently added to the suspension and dissolved by mixing in a magnetic stirrer for about 8 h. The solution was kept idle for about 3 h to remove any bubbles before being electrospun using a Nanon-01A (MECC Japan) electrospinning set up fitted with a rotating aluminum drum collector which was wrapped with cotton fabric. The optimum electrospinning parameters were selected and applied. These parameters were set as follows: applied voltage (25 kV), feed flow rate (1 mL/h), needle internal diameter (0.833 mm), dope solution volume (1 mL), drum rotation speed (50 rpm), and relative humidity in the chamber (50%).

Example 8

Rejection of Virus

The performance of a filter material including PL-ABG membranes was evaluated for virus rejection. In particular, the PL-ABG membranes were tested with wastewater containing COVID-19 viral particles, to permit evaluation of the membrane's interactions with the virus. Raw wastewater samples containing COVID-19 viral particles were filtered through a 0.22-micron filter paper to remove all the macropollutants and bacteria. Specific area (2.5*6 cm$^2$) of the membrane coupons were then mixed with about 50 mL wastewater and kept idle for about 24 h in centrifuge tubes. Membranes were then removed and dried, and the microstructures were analyzed using high-resolution SEM. SEM images presented in FIGS. 4A-4D illustrate the antiviral properties of membranes containing anise, black seeds, and glycerol monolaurate+zinc. While the pristine PL membrane showed the attachment of viral particles, the PL-ABG membrane did not show any viral particles bound onto its surface. FIGS. 5A-5B provide an illustration of the above observation.

Examples 9

Nanofiber membranes with the following compositions were fabricated (on cotton substrate): 15P_ABG111(3 h), 15P_ABG211(3 h), 15P_ABG112(3 h), 15P_ABG212(3 h), 15P_ABG111(2 h), 15P_ABG212(2 h), 15P_ABG112(2 h), 15P_ABG211(1 h), 15P_ABG212(1 h). Their differential pressure results are displayed below (Table 1). 15P_ABG211 (1 h) and 15P_ABG212(1 h) have shown highest breathability with differential pressures of 25.53, and 39.99 Pa/cm$^2$ respectively. Their BFE was found to be ~99%, and hence these two membranes are chosen as exemplary candidates for the biodegradable mask material.

TABLE 1

Compositions and Differential Pressures of Various Nanofiber Membranes Spun on Cotton Fabric.

| Type | PLA conc. (% wt./wt. of the solution) | Anis conc. (% wt./wt. of the PLA) | Black seed conc. (% wt./wt. of the PLA) | Glycerol monolaurate + Zn conc. (% wt./wt. of the PLA) | Spinning Time (h) | Differential Pressure (Breathability) (Pa/cm$^2$) |
|---|---|---|---|---|---|---|
| A | 15 | 1 | 1 | 2 | 3 | 78.14 |
| B | 15 | 2 | 1 | 1 | 3 | 135.46 |
| C | 15 | 1 | 1 | 1 | 3 | 80.48 |
| D | 15 | 2 | 1 | 2 | 3 | 160.5 |
| E | 15 | 1 | 1 | 1 | 2 | 109.09 |
| F | 15 | 2 | 1 | 2 | 2 | 68.14 |
| G | 15 | 1 | 1 | 2 | 2 | 157.88 |
| H | 15 | 2 | 1 | 1 | 1 | 25.53 |
| I | 15 | 2 | 1 | 2 | 1 | 39.99 | where:

| | |
|---|---|
| A | 15P_ABG112-3h |
| B | 15P_ABG211-3h |
| C | 15P_ABG111-3h |
| D | 15P_ABG212-3h |
| E | 15P_ABG111-2h |
| F | 15P_ABG212-2h |
| G | 15P_ABG112-2h |
| H | 15P_ABG211-1h |
| I | 15P_ABG212-1h |

15

In addition, 15P_ABG212(1 h) nanofiber membranes were spun on different biodegradable and bio-based fabrics such as *Libellula*, Georgette, *Perla, Alga*, Sarah, etc. and the results were listed in Table 2. Highest levels of breathability and >99 BFE were reported when material was incorporated with the aforementioned fabrics.

TABLE 2

Differential pressures of various nanofiber membranes spun on different types of fabrics, illustrating the flexibility and compatibility of our nanofiber fabrication on different types of fabrics.

| Type | Differential Pressure (Breathability) (Pa/cm$^2$) |
|---|---|
| Libellula + nanofiber membrane [15P_ABG212(1 h)] | 70.77 |
| Libellula + nanofiber membrane [15P_ABG212(1 h)] + Libellula | 88.26 |
| Alga + nanofiber membrane [15P_ABG212(1 h)] | 42.24 |
| Alga + nanofiber membrane [15P_ABG212(1 h)] + Alga (sandwiched) | 52.44 |
| SarahJersey + nanofiber membrane [15P_ABG212(1 h)] | 47.43 |
| Perla + nanofiber membrane [15P_ABG212(1 h)] | 60.39 |

What is claimed is:

1. A filter material comprising:
an electrospun nanofiber membrane and active nanomaterial agents incorporated into the electrospun nanofiber membrane, wherein the electrospun nanofiber membrane filters disease-causing agents, wherein the active nanomaterial agent degrades disease-causing agents, wherein the active nanomaterial agents comprise star anise, black seeds, and a mixture of glycerol monolaurate and zinc, and wherein the electrospun nanofiber membrane has
a differential pressure of less than 80 Pa cm$^{-2}$.

2. The filter material according to claim 1, wherein the active nanomaterial agents further include one or more of tungsten oxide (WO$_3$), black seeds, star anise, glycerol monolaurate, zine, titanium oxide (TiO$_2$), zinc oxide (ZnO), Ag, silicon dioxide (SiO$_2$), CuO, rGO/TiO$_2$, Fe$_3$O$_4$, metal-organic framework, zirconium oxide (ZrO$_2$), SnO$_2$, aluminium oxide (Al$_2$O$_3$), aluminium phosphate (AlPO$_4$), aluminium hydrogen phosphate (Al$_2$(HPO$_4$)$_3$), aluminium dihydrogen phosphate (Al(H$_2$PO$_4$)$_3$), calcium oxide (CaO), calcium carbonate (CaCO$_3$), calcium silicate (CaSiO$_4$), calcium phosphate (Ca$_3$(PO$_4$)$_2$), calcium hydrogen phosphate (CaHPO$_4$), calcium dihydrogen phosphate (Ca(H$_2$PO$_4$), silicon nitride (SiN), silicon carbide (SiC), boron nitride (BN), tungsten carbide (WC), and titanium carbonitride (TiC$_{0.5}$N$_{0.5}$).

3. The filter material according to claim 1, wherein the active nanomaterial agents further include tungsten oxide (WO$_3$) nanoparticles.

4. The filter material according to claim 1, wherein the electrospun nanofiber membrane has a differential pressure of less than 65 Pa cm$^{-2}$.

5. The filter material according to claim 1, wherein the active nanomaterial agents are less than about 10% by weight of the total weight of the electrospun nanofiber membrane.

6. The filter material according to claim 1, wherein the electrospun nanofiber membrane includes one or more of polymethylmethacrylate (PMMA), polyvinyl alcohol (PVA), polyvinyl phenol (PVP), polyvinylchloride (PVC), polyvinylcarbazole, polyvinylidene fluoride (PVDF), polyacrylonitrile (PAN), polylactic acid (PLA), polyvinylidene fluoride-co-hexafluoropropylene (PVDF-HFP), tetrahydro perfluorooctyl acrylate, silica, nanocrystalline cellulose, alginate, and polyethylene oxide (PEO).

7. The filter material according to claim 1, wherein the electrospun nanofiber membrane includes poly(vinylidene fluoride-co-hexafluoropropylene) (PVDF-HFP).

8. The filter material according to claim 1, wherein the electrospun nanofiber membrane includes polylactic acid (PLA).

9. The filter material according to claim 1, wherein the filter material is derived from an electrospun solution including about 15 wt. % polymer based on the total weight of the solution, about 1-2 wt. % star anise based on the total weight of the polymer, about 1 wt. % black seeds based on the total weight of the polymer, and about 1-2 wt. % of the mixture of glycerol monolaurate and zinc based on the total weight of the polymer.

10. The filter material according to claim 1, wherein the electrospun nanofiber membrane includes polylactic acid (PLA), and wherein the filter material as a whole is biocompatible, biodegradable, or both.

11. The filter material according to claim 1, wherein the electrospun nanofiber membrane includes poly(vinylidene fluoride-co-hexafluoropropylene) (PVDF-HFP) and wherein the active nanomaterial agents include tungsten oxide (WO$_3$) nanoparticles.

12. The filter material according to claim 1, further comprising a polydopamine coating which covers at least a portion of a surface of the electrospun nanofiber membrane.

13. The filter material according to claim 1, wherein the electrospun nanofiber membrane has the following characteristics:
an average pore diameter of about 1.7 μm or less;
a bacterial filtration efficiency of at least 95%; and
a thickness of about 140 μm or less.

14. The filter material according to claim 9, wherein the polymer is polylactic acid (PLA).

15. A method for preparing the filter material of claim 1 comprising:
combining the nanomaterial agents with one or more solvents to form a first solution,
mixing one or more polymers into the first solution to form a second solution, and
electrospinning the second solution to form the electrospun nanofiber membrane of the filter material.

16. The method of claim 15, wherein electrospinning lasts about 1 hour.

17. The method of claim 15 wherein the one or more polymers includes polylactic acid (PLA) and wherein the electrospun nanofiber membrane as a whole is biocompatible, biodegradable, or both.

18. The method of claim 15 wherein the second solution comprises one or more polymers at about 15 wt. % based on the total weight of the solution, about 1-2 wt. % star anise based on the total weight of the one or more polymers, about 1 wt. % black seeds based on the total weight of the one or more polymers, and about 1-2 wt. % a combined mixture of glycerol monolaurate and zinc based on the total weight of the one or more polymers.

19. The method of claim 15, wherein the one or more polymers includes poly(vinylidene fluoride-co-hexafluoropropylene) (PVDF-HFP) and wherein the active nanomaterial agents include tungsten oxide (WO$_3$) nanoparticles.

20. The method of claim 15, wherein the electrospun nanofiber membrane has a differential pressure of less than 65 Pa cm$^{-2}$.

\* \* \* \* \*